US011938746B2

(12) United States Patent
Yamanobe

(10) Patent No.: US 11,938,746 B2
(45) Date of Patent: Mar. 26, 2024

(54) IMAGE FORMING DEVICE AND MANUFACTURING METHOD OF PRINTED MATERIAL

(71) Applicant: FUJIFILM Corporation, Tokyo (JP)

(72) Inventor: Jun Yamanobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 17/809,245

(22) Filed: Jun. 27, 2022

(65) Prior Publication Data

US 2022/0324244 A1 Oct. 13, 2022

Related U.S. Application Data

(63) Continuation of application No. PCT/JP2020/048824, filed on Dec. 25, 2020.

(30) Foreign Application Priority Data

Jan. 23, 2020 (JP) ................................ 2020-009325

(51) Int. Cl.
*B41M 5/00* (2006.01)
*B41J 2/01* (2006.01)
(Continued)

(52) U.S. Cl.
CPC .............. *B41M 5/0011* (2013.01); *B41J 2/01* (2013.01); *B41J 2/16505* (2013.01);
(Continued)

(58) Field of Classification Search
CPC ...... B41M 5/0011; B41J 2/01; B41J 2/16505; B41J 2/16508; B41J 2/16535;
(Continued)

(56) References Cited

U.S. PATENT DOCUMENTS 6,364,449 B1 4/2002 Takahashi et al.
7,766,472 B2 8/2010 Oishi
(Continued)

FOREIGN PATENT DOCUMENTS

JP 2000-153622 A 6/2000
JP 2007-190770 A 8/2007
(Continued)

OTHER PUBLICATIONS

International Search Report issued in PCT/JP2020/048824; dated Mar. 16, 2021.
(Continued)

*Primary Examiner* — Yaovi M Ameh
(74) *Attorney, Agent, or Firm* — Studebaker & Brackett PC

(57) ABSTRACT

Provided are an image forming device that always forms an image with an optimum treatment quality, and a manufacturing method of a printed material. An image forming device includes a transport unit that transports a recording medium in a transport direction, a printing unit that applies an ink to a printing surface of the transported recording medium to perform printing, a treatment unit that performs treatment on the transported recording medium, and a movement unit that changes a distance between the printing unit and the treatment unit in the transport direction, in which the distance is controlled based on at least one information of information on a transportation speed of the recording medium in the transport unit, information on an applied amount of the ink in the printing unit, or information on a surface state of the printing surface of the recording medium.

13 Claims, 5 Drawing Sheets

(51) Int. Cl.
*B41J 2/165* (2006.01)
*B41J 11/00* (2006.01)
*B41J 2/21* (2006.01)
*B41J 15/04* (2006.01)

(52) U.S. Cl.
CPC ....... *B41J 2/16508* (2013.01); *B41J 2/16535* (2013.01); *B41J 11/00216* (2021.01); *B41J 2/16552* (2013.01); *B41J 2/16585* (2013.01); *B41J 2/2114* (2013.01); *B41J 15/04* (2013.01); *B41J 2203/011* (2020.08)

(58) Field of Classification Search
CPC .............. B41J 11/00216; B41J 2/16552; B41J 2/16585; B41J 2/2114; B41J 15/04; B41J 2203/011
See application file for complete search history.

(56) References Cited

U.S. PATENT DOCUMENTS

| | | | | |
|---|---|---|---|---|
| 9,370,942 | B2 | 6/2016 | Ohnishi | |
| 2007/0165091 | A1* | 7/2007 | Oishi | B41J 11/00212 347/102 |
| 2008/0001983 | A1 | 1/2008 | Kawakami et al. | |
| 2008/0218574 | A1* | 9/2008 | Furuno | B41J 13/223 347/100 |
| 2009/0207224 | A1 | 8/2009 | Cofler | |
| 2012/0081451 | A1* | 4/2012 | Kondo | B41J 2/362 347/19 |

FOREIGN PATENT DOCUMENTS

| | | | | |
|---|---|---|---|---|
| JP | 2008-006734 | A | 1/2008 | |
| JP | 2015-074110 | A | 4/2015 | |
| JP | 2016-199015 | A | 12/2016 | |
| JP | 6183138 | B2 * | 8/2017 | B41J 11/002 |
| JP | 2017-166214 | A | 9/2017 | |

OTHER PUBLICATIONS

International Preliminary Report on Patentability (Chapter I) and Written Opinion of the International Searching Authority issued in PCT/JP2020/048824; dated Jul. 26, 2022.

The extended European search report issued by the European Patent Office dated Jun. 9, 2023, which corresponds to European Patent Application No. 20915288.3-1014 and is related to U.S. Appl. No. 17/809,245.

* cited by examiner

IMAGE FORMING DEVICE AND MANUFACTURING METHOD OF PRINTED MATERIAL

CROSS-REFERENCE TO RELATED APPLICATIONS

The present application is a Continuation of PCT International Application No. PCT/JP2020/048824 filed on Dec. 25, 2020 claiming priority under 35 U.S.C. § 119(a) to Japanese Patent Application No. 2020-009325 filed on Jan. 23, 2020. Each of the above applications is hereby expressly incorporated by reference, in its entirety, into the present application.

BACKGROUND OF THE INVENTION

1. Field of the Invention

The present invention relates to an image forming device and a manufacturing method of a printed material, and more particularly to a technology for performing additional printing on a recording medium on which an image is printed in advance.

2. Description of the Related Art

There is known an additional printing device that performs variable-printing of an address, a date, and the like on a recording medium on which an image is printed in advance.

JP2016-199015A discloses a card processing system that partially prints a predetermined content, such as a barcode, on a card on which nothing is printed and a card on which predetermined printing, such as a pattern, is performed on a base. The card processing system disclosed in JP2016-199015A comprises a transport unit that transports the card, a pretreatment unit that performs pretreatment on a part of a surface of the card transported by the transport unit, and a printing unit that performs printing on a location on the surface of the card transported by the transport unit on which the pretreatment is performed by the pretreatment unit. With the system disclosed in JP2016-199015A, since a coating layer is formed by the pretreatment only on a part of the surface of the card, it is possible to suppress an adverse effect of the coating layer in the post-process as much as possible.

SUMMARY OF THE INVENTION

In general, a pretreatment quality performed before printing varies depending on a transport condition, a printing condition, or a recording medium condition. For example, in the card processing system disclosed in JP2016-199015A, since the presence or absence of the pattern of the base and a surface state of the card due to the pattern of the base vary, the pretreatment quality varies. Therefore, there is a problem that printing cannot always be performed with an optimum treatment quality. There is a similar problem with a post-treatment quality performed after printing.

The present invention has been made in view of such circumstances, and is to provide an image forming device that always forms an image with an optimum treatment quality, and a manufacturing method of a printed material.

In order to achieve the above object, an aspect of the present invention relates to an image forming device comprising a transport unit that transports a recording medium in a transport direction, a printing unit that is disposed to face the transport unit and applies an ink to a printing surface of the transported recording medium to perform printing, a treatment unit that is disposed to face the transport unit and performs treatment on the transported recording medium, a movement unit that changes a distance between the printing unit and the treatment unit in the transport direction, an information acquisition unit that acquires at least one information of information on a transportation speed of the recording medium in the transport unit, information on an applied amount of the ink in the printing unit, or information on a surface state of the printing surface of the recording medium, and a distance control unit that controls the distance based on the acquired information.

According to the present aspect, since at least one information of the information on the transportation speed of the recording medium in the transport unit, the information on the applied amount of the ink in the printing unit, or the information on the surface state of the printing surface of the recording medium is acquired to control the distance between the printing unit and the treatment unit in the transport direction based on the acquired information, it is possible to always form the image with the optimum treatment quality.

In particular, by controlling the distance while keeping the transportation speed of the recording medium in the transport unit at a certain speed, it is possible to control a time from printing to treatment of the recording medium, or a time from treatment to printing, and it is possible to keep the treatment quality at a certain level.

It is preferable that an image be printed on the printing surface of the recording medium in advance before printing by the printing unit and treatment by the treatment unit, the information acquisition unit acquire information on density of the image printed in advance, as the information on the surface state of the printing surface of the recording medium, and the distance control unit increase the distance between the treatment unit and the printing unit in the transport direction as the acquired density is denser. As a result, it is possible to form the image with the optimum treatment quality regardless of the surface state of the printing surface of the recording medium. The information acquisition unit may acquire, as the information on the surface state of the printing surface of the recording medium, information on density of a region of the image printed in advance to which the ink is applied in the printing unit.

It is preferable that an image be printed on the printing surface of the recording medium in advance before the printing by the printing unit and the treatment by the treatment unit, the information acquisition unit acquire whether the image printed in advance is an electrophotographic picture or an image printed by using an energy ray curable ink, as the information on the surface state of the printing surface of the recording medium, and the distance control unit decrease the distance between the printing unit and the treatment unit in the transport direction in a case in which the image printed in advance is the electrophotographic picture or the image printed by using the energy ray curable ink. As a result, it is possible to form the image with the optimum treatment quality regardless of the surface state of the printing surface of the recording medium.

It is preferable that the information acquisition unit acquire the information on the transportation speed of the recording medium in the transport unit, and the distance control unit increase the distance as the acquired transportation speed is faster. As a result, it is possible to form the image with the optimum treatment quality regardless of the transportation speed.

It is preferable that the information acquisition unit acquire the information on the applied amount of the ink in the printing unit, and the distance control unit decrease the distance as the acquired applied amount of the ink is larger. As a result, it is possible to form the image with the optimum treatment quality regardless of the applied amount of the ink.

It is preferable that the printing unit and the treatment unit be movable in a width direction intersecting the transport direction, the printing unit be able to perform printing on a part of the recording medium, and the treatment unit be able to perform treatment on a part of the recording medium. By performing printing and treatment of a part of the recording medium, it is effective without waste in a case of additional printing in which it is not necessary to perform printing on the entire surface of the recording medium.

It is preferable that the printing unit and the treatment unit be independently movable in the width direction. As a result, it is possible to reduce a weight of the printing unit.

It is preferable that the image forming device further comprise a position control unit that controls movement of the treatment unit in the width direction based on positional information of the printing unit in the width direction. As a result, it is possible to move the treatment unit to the same position as the printing unit.

It is preferable that position accuracy of movement of the treatment unit in the width direction be lower than position accuracy of movement of the printing unit in the width direction. Since the treatment unit does not require highly accurate position adjustment, it is possible to reduce a cost by coarsening the position accuracy.

It is preferable that the printing unit include an ink jetting head that jets the ink from a nozzle, a cleaning unit that is disposed adjacent to the transport unit in the width direction and wipes a nozzle surface of the ink jetting head on which the nozzle is disposed, and a capping unit that is disposed adjacent to the transport unit in the width direction and moisturizes the nozzle surface of the ink jetting head, and the movement unit change the distance by moving the treatment unit in the transport direction. As a result, it is possible to change the distance without moving the cleaning unit and the capping unit in the transport direction.

It is preferable that the treatment unit include a pretreatment unit that is disposed on an upstream side of the printing unit in the transport direction and performs, on the transported recording medium, at least one pretreatment of applying a pretreatment liquid that chemically reacts with the applied ink, irradiation of energy light that promotes permeation of the applied ink into the printing surface, or surface reforming that suppresses spread of the applied ink on the printing surface. As a result, it is possible to appropriately perform pretreatment on the recording medium.

It is preferable that the treatment unit include a post-treatment unit that is disposed on a downstream side of the printing unit in the transport direction and performs, on the transported recording medium, at least one post-treatment of irradiation of energy light that cures the applied ink or drying of the applied ink. As a result, it is possible to appropriately perform pretreatment on the recording medium.

It is preferable that the image forming device further comprise a main printing unit that is disposed to face the transport unit on an upstream side of the printing unit and the treatment unit in the transport direction, and performs main printing on the printing surface of the transported recording medium. As a result, it is possible to perform, by the printing unit, additional printing on the recording medium printed by the main printing unit.

In order to achieve the above object, another aspect of the present invention relates to a manufacturing method of a printed material, the method comprising a transport step of transporting a recording medium in a transport direction by a transport unit, a printing step of applying an ink to a printing surface of the transported recording medium to perform printing by a printing unit that is disposed to face the transport unit, a treatment step of performing treatment on the transported recording medium by a treatment unit that is disposed to face the transport unit, an information acquisition step of acquiring at least one information of information on a transportation speed of the recording medium in the transport unit, information on an applied amount of the ink in the printing unit, or information on a surface state of the printing surface of the recording medium, and a distance control step of controlling a distance between the printing unit and the treatment unit in the transport direction based on the acquired information by a movement unit that changes the distance.

According to the present aspect, since at least one information of the information on the transportation speed of the recording medium in the transport unit, the information on the applied amount of the ink in the printing unit, or the information on the surface state of the printing surface of the recording medium is acquired to control the distance between the printing unit and the treatment unit in the transport direction based on the acquired information, it is possible to always form the image with the optimum treatment quality.

According to the present invention, it is possible to always form the image with the optimum treatment quality.

DESCRIPTION OF THE PREFERRED EMBODIMENTS

A preferred embodiment of the present invention will be described below in detail with reference to the accompanying drawings.

<Configuration of Image Forming Device>

Figure 1:
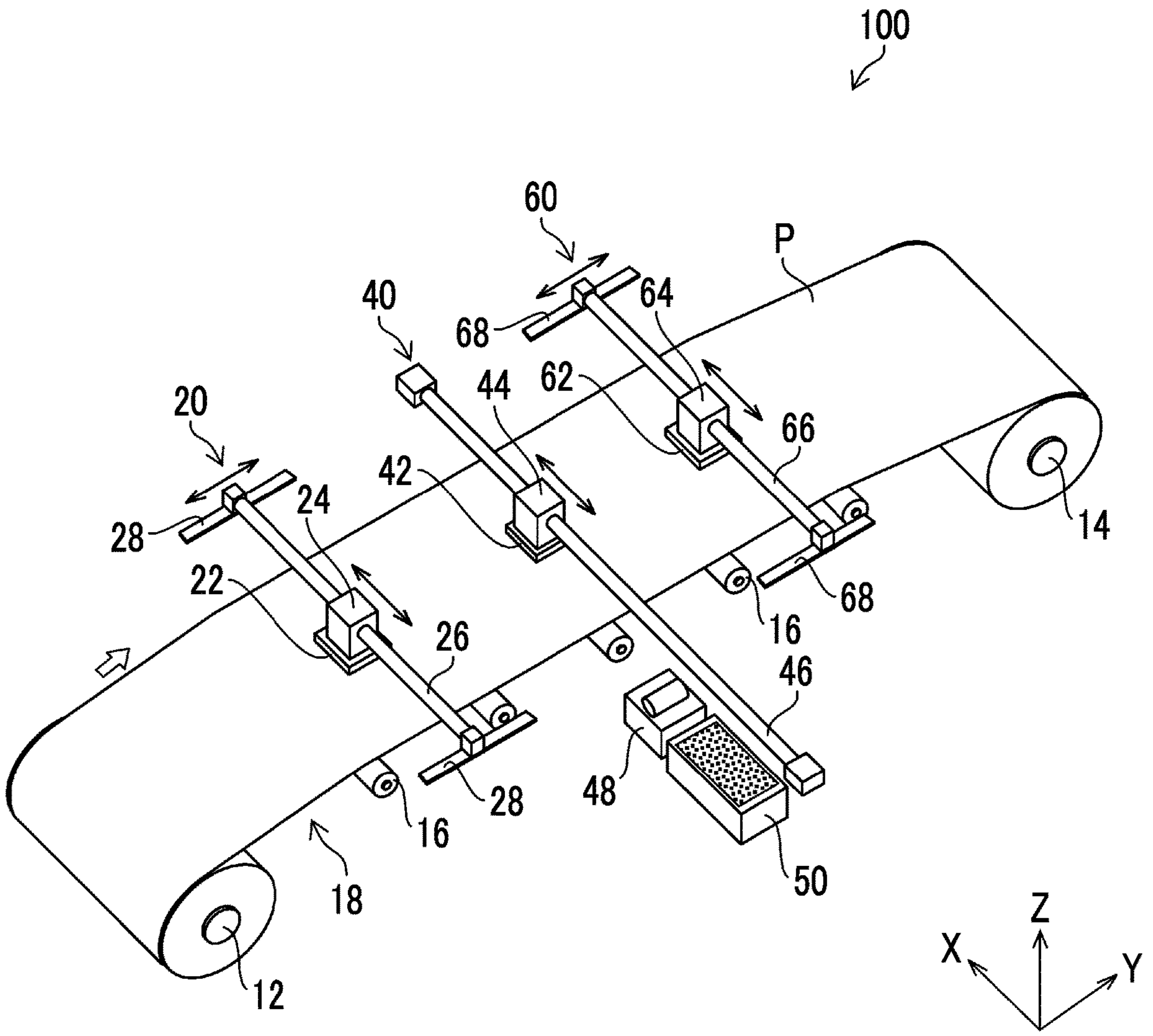
FIG. 1 is a perspective view of an image forming device.
Figure 2:
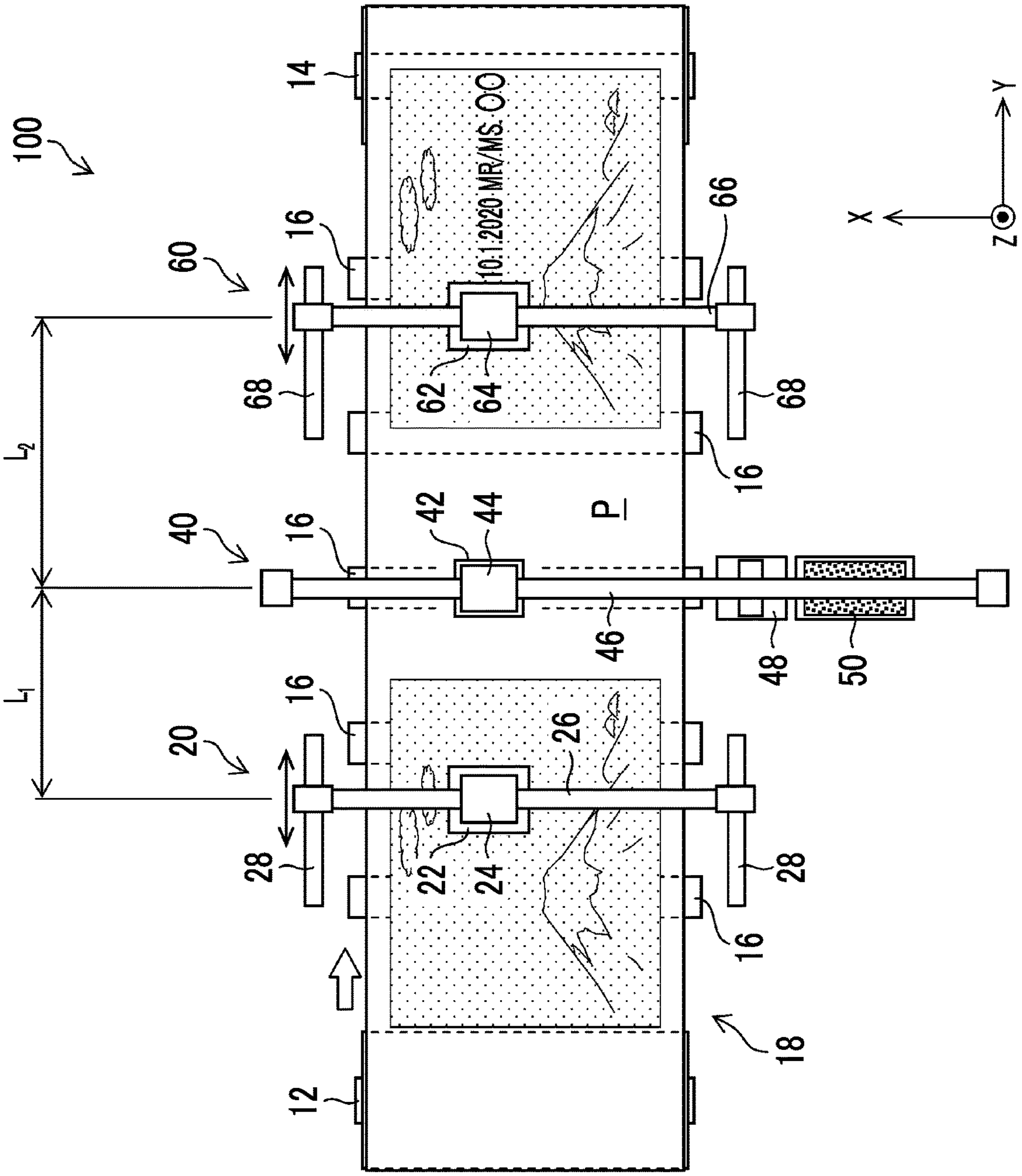
FIG. 2 is a top view of the image forming device.

FIG. 1 is a perspective view of an image forming device 100 according to the present embodiment. In addition, FIG. 2 is a top view of the image forming device 100. In FIGS. 1 and 2, the X, Y, and Z-directions are orthogonal directions to each other, the X-direction and the Y-direction are horizontal directions, and the Z-direction is a vertical direction. The image forming device 100 is an inkjet printing device that prints an image by applying an ink to a long recording medium P.

As the recording medium P, various media, such as paper, non-woven fabric, vinyl chloride, synthetic chemical fiber, polyethylene, polyester, tarpaulin, can be used regardless of a material, and regardless of whether it is a permeable medium or a non-permeable medium. In the recording medium P according to the present embodiment, the image is printed in advance on a printing surface. A printing method of the image printed in advance is not particularly limited, and examples thereof include inkjet printing, offset printing, and electrophotographic picture.

The image forming device 100 manufactures a printed material by performing additional printing on a part of the printing surface of the recording medium P. The image forming device 100 may perform printing on the recording medium P in which the image is not printed on the printing surface, in addition to additional printing.

As shown in FIGS. 1 and 2, the image forming device 100 comprises a sending reel 12, a winding reel 14, a plurality of pass rollers 16, a pretreatment unit 20, a printing unit 40, and a post-treatment unit 60.

The sending reel 12 is rotatably supported by a side wall (not shown). The recording medium P on which the image is printed in advance on the printing surface is wound on the sending reel 12 in a roll shape. A sending motor (not shown) that rotates and drives the sending reel 12 is connected to the sending reel 12.

The winding reel 14 is rotatably supported by a side wall (not shown). One end of the recording medium P is connected to the winding reel 14. A winding motor (not shown) that rotates and drives the winding reel 14 is connected to the winding reel 14.

The plurality of pass rollers 16 are arranged along a transport path of the recording medium P from the sending reel 12 to the winding reel 14. The sending reel 12, the winding reel 14, and the pass rollers 16 constitute a transport unit 18 that transports the recording medium P in the Y-direction, which is a transport direction. The transport unit 18 guides the recording medium P along the transport path from the sending reel 12 to the winding reel 14 by the plurality of pass rollers 16 and transports the recording medium P in a roll-to-roll manner. It should be noted that the transport unit 18 may comprise a transportation speed detection unit (not shown) that detects the transportation speed of the recording medium P, and an inline sensor (not shown) that captures the image printed in advance on the recording medium P.

Here, the transport unit 18 transports the recording medium P from the sending reel 12 to the winding reel 14 in a certain direction (Y-direction), but space saving may be achieved by folding back a traveling direction of the recording medium P by the plurality of pass rollers 16.

In the transport path of the recording medium P, the pretreatment unit 20, the printing unit 40, and the post-treatment unit 60 are arranged in order from an upstream side in the transport direction of the recording medium P to face the transport unit 18.

The pretreatment unit 20 (example of the treatment unit) is disposed on the upstream side of the printing unit 40 in the transport direction of the recording medium P. The pretreatment unit 20 performs pretreatment on the transported recording medium P. The pretreatment unit 20 can perform pretreatment on a part of the recording medium P.

The pretreatment unit 20 performs, on the recording medium P transported by the transport unit 18, at least one pretreatment of applying a pretreatment liquid that chemically reacts with the ink applied in the printing unit 40, irradiation of the energy light that promotes permeation of the ink applied in the printing unit 40 into the printing surface, or surface reforming that suppresses spread of the ink applied in the printing unit 40 on the printing surface. Here, a case will be described in which the pretreatment liquid is applied.

The pretreatment unit 20 comprises a pretreatment liquid jetting head 22, a pretreatment carriage 24, a pretreatment X-direction guide 26, and a pair of pretreatment Y-direction guides 28.

The pretreatment liquid jetting head 22 is a pretreatment liquid jetting unit that jets the pretreatment liquid by an inkjet method. The pretreatment liquid jetting head 22 applies the pretreatment liquid to the printing surface of the recording medium P. The pretreatment liquid contains an aggregating agent having an action of aggregating the components contained in the ink applied by the printing unit 40. Examples of the aggregating agent include an acidic compound, a polyvalent metal salt, and a cationic polymer. The pretreatment liquid according to the present embodiment is an acidic liquid containing acid as the aggregating agent. An amount of the pretreatment liquid applied by the pretreatment unit 20 need only be an applied amount that appropriately aggregates the ink by the printing unit 40.

The pretreatment unit 20 may apply the pretreatment liquid to the printing surface of the recording medium P using a coating roller.

The pretreatment carriage 24 supports the pretreatment liquid jetting head 22. The pretreatment X-direction guide 26 movably supports the pretreatment carriage 24 along the X-direction, which is a width direction intersecting the transport direction of the recording medium P. The pair of pretreatment Y-direction guides 28 support the pretreatment X-direction guide 26 to be movable along the Y-direction from both sides in the X-direction. The pretreatment X-direction guide 26 and the pair of pretreatment Y-direction guides 28 each comprise a motor (not shown).

The pair of pretreatment Y-direction guides 28 correspond to a movement unit that changes a distance between the pretreatment unit 20 and the printing unit 40 in the transport direction of the recording medium P. Since the pretreatment unit 20 comprises the movement unit, it is not necessary to move the printing unit 40. Therefore, the distance can be changed without moving a cleaning unit 48 and a capping unit 50, which will be described below, in the Y-direction.

The printing unit 40 applies the ink to the printing surface of the recording medium P transported by the transport unit 18 to perform printing (image forming). The printing unit 40 can perform printing on a part of the recording medium P. The printing unit 40 comprises an ink jetting head 42, a printing carriage 44, a printing X-direction guide 46, the cleaning unit 48, and the capping unit 50.

The ink jetting head 42 is an ink jetting unit that jets the ink by the inkjet method from a nozzle (not shown) disposed on a nozzle surface (not shown). The ink jetting head 42 applies the ink to the printing surface of the recording medium P to print the image. As the ink, an aqueous ink in which water or a water-soluble solvent and a coloring material, such as a dye or a pigment, are dissolved or dispersed is used. The ink applied to the printing surface of the recording medium P is aggregated by the pretreatment liquid applied in advance to the printing surface by the pretreatment unit 20.

The printing carriage 44 supports the ink jetting head 42. The printing X-direction guide 46 movably supports the printing carriage 44 along the X-direction. The printing X-direction guide 46 comprises a motor (not shown).

The cleaning unit 48 and the capping unit 50 are disposed at positions adjacent to the transport unit 18 on the X-direction side and facing the printing X-direction guide 46.

The cleaning unit 48 includes a wiping member (not shown). The cleaning unit 48 wipes the nozzle surface of the ink jetting head 42 in a case in which the ink jetting head 42 is moved between the position facing the transport unit 18 and the position facing the capping unit 50.

The capping unit 50 contains a moisturizer (not shown). In a case in which the ink jetting head 42 is moved to the position facing the capping unit 50, the capping unit 50 moisturizes the nozzle surface of the ink jetting head 42.

The cleaning unit 48 and the capping unit 50 may be provided in the pretreatment unit 20. Since the pretreatment unit 20 comprises the cleaning unit 48 and the capping unit 50, the nozzle surface of the pretreatment liquid jetting head 22 can be wiped and moisturized.

The post-treatment unit 60 (example of the treatment unit) is disposed on the downstream side of the printing unit 40 in the transport direction of the recording medium P. The post-treatment unit 60 performs post-treatment on the transported recording medium P. The post-treatment unit 60 can perform post-treatment on a part of the recording medium P.

The post-treatment unit 60 performs, on the recording medium P transported by the transport unit 18, at least one post-treatment of irradiation of the energy light that cures the ink applied in the printing unit 40 or drying of the ink applied in the printing unit 40. Here, a case will be described in which the ink is dried.

The post-treatment unit 60 comprises an infrared heater 62, a post-treatment carriage 64, a post-treatment X-direction guide 66, and a pair of post-treatment Y-direction guides 68.

The infrared heater 62 includes an infrared light source that emits infrared rays. The infrared heater 62 irradiates the printing surface of the recording medium P with the infrared rays to dry the ink applied to the printing surface by the printing unit 40.

The post-treatment unit 60 may include a fan or a blower that blows dry air to dry the ink applied to the printing surface.

The post-treatment carriage 64 supports the infrared heater 62. The post-treatment X-direction guide 66 movably supports the post-treatment carriage 64 along the X-direction. The pair of post-treatment Y-direction guides 68 support the pretreatment X-direction guide 26 to be movable along the Y-direction from both sides in the X-direction. The post-treatment X-direction guide 66 and the pair of post-treatment Y-direction guides 68 each comprise a motor (not shown).

The pair of post-treatment Y-direction guides 68 correspond to a movement unit that changes the distance between the printing unit 40 and the post-treatment unit 60 in the transport direction of the recording medium P. Since the post-treatment unit 60 comprises the movement unit, it is not necessary to move the printing unit 40. Therefore, the distance can be changed without moving the cleaning unit 48 and the capping unit 50 in the Y-direction.

In the image forming device 100, the pretreatment liquid jetting head 22 of the pretreatment unit 20, the ink jetting head 42 of the printing unit 40, and the infrared heater 62 of the post-treatment unit 60 can be independently moved in the X-direction.

<Electrical Configuration of Image Forming Device>

Figure 3:
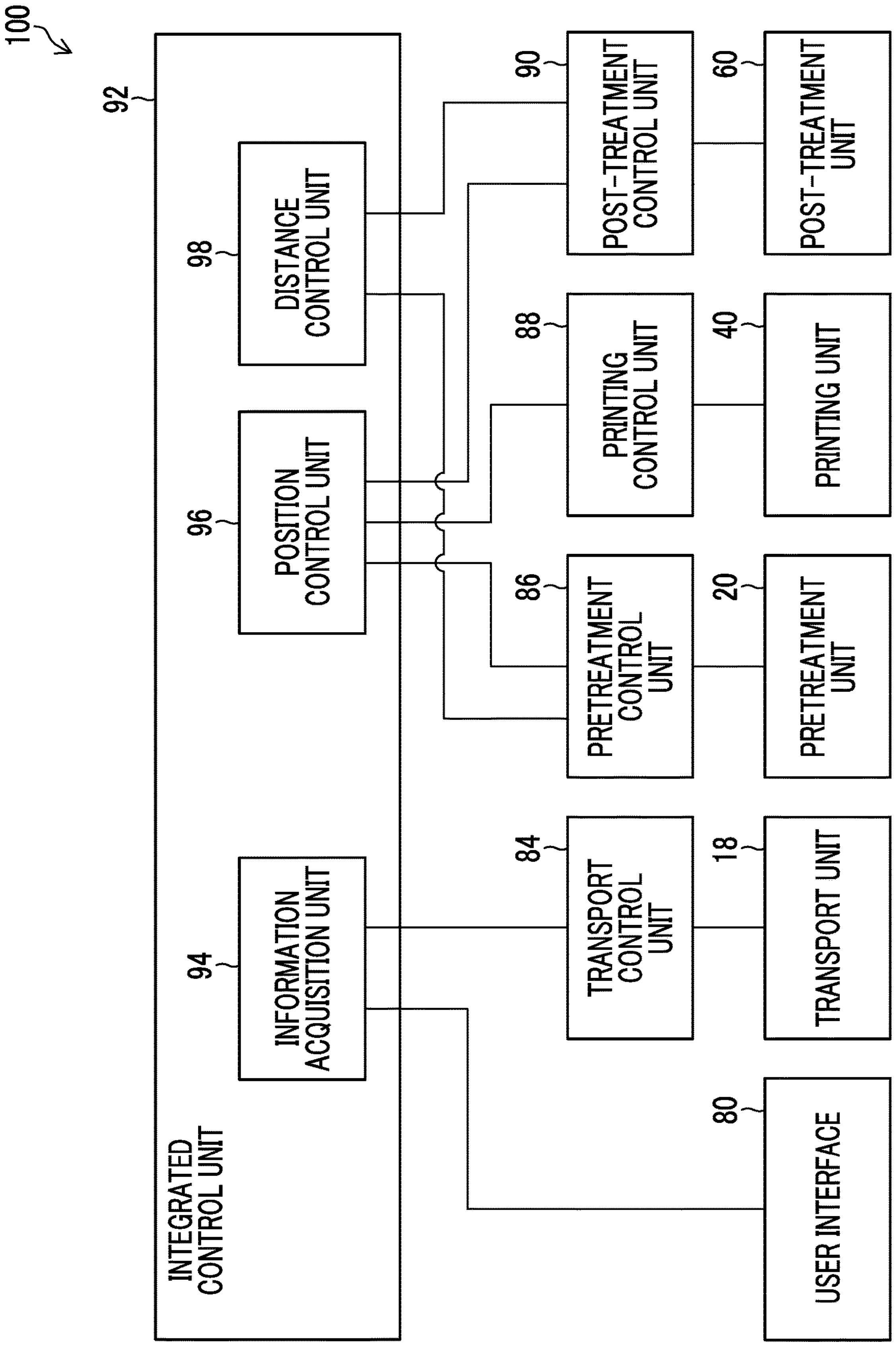
FIG. 3 is a block diagram showing an electrical configuration of the image forming device.

FIG. 3 is a block diagram showing an electrical configuration of the image forming device 100. As shown in FIG. 3, the image forming device 100 comprises a user interface 80, a transport control unit 84, a pretreatment control unit 86, a printing control unit 88, a post-treatment control unit 90, and an integrated control unit 92.

The user interface 80 comprises an input unit (not shown) and a display unit (not shown) for a user to operate the image forming device 100. The input unit is, for example, an operation panel that receives the input from the user. The display unit is, for example, a display that displays image data and various pieces of information. The user can operate the user interface 80 to print a desired image by the image forming device 100.

The user may operate the user interface 80 to input the image data to be printed by the printing unit 40 and printing position information which is information on positions in the X-direction and the Y-direction for printing the image. In addition, the user may operate the user interface 80 to input information on the image printed in advance on the recording medium P.

The transport control unit 84 controls the transport unit 18. The transport control unit 84 rotates and drives the reel of the sending reel 12 by the sending motor (not shown), and sends the recording medium P from the sending reel 12. The transport control unit 84 rotates and drives the reel of the winding reel 14 by the winding motor (not shown), and wounds the recording medium P by the winding reel 14. The transport control unit 84 may acquire the transportation speed of the recording medium P from the transportation speed detection unit (not shown) to perform a feedback control of the rotation speeds of the sending motor and the winding motor based on the acquired transportation speed.

The pretreatment control unit 86 controls the rotation and driving of the motor (not shown) of the pretreatment X-direction guide 26 to move the pretreatment carriage 24 in the X-direction. The pretreatment control unit 86 rotates and drives the motor (not shown) of the pretreatment Y-direction guide 28 to move the pretreatment X-direction guide 26 in the Y-direction. Further, the pretreatment control unit 86 controls jetting of the pretreatment liquid by the pretreatment liquid jetting head 22.

The printing control unit 88 controls the rotation and driving of the motor (not shown) of the printing X-direction guide 46 to move the printing carriage 44 in the X-direction. It should be noted that the position accuracy of the movement of the printing carriage 44 in the X-direction is higher than the position accuracy of the movement of the pretreatment carriage 24 in the X-direction. In addition, the printing control unit 88 controls jetting of the ink by the ink jetting head 42.

The printing control unit 88 controls the cleaning unit 48 to control wiping of the nozzle surface of the ink jetting head 42. The printing control unit 88 controls the capping unit 50 to control the moisturizing of the nozzle surface of the ink jetting head 42.

The post-treatment control unit 90 controls the rotation and driving of the motor (not shown) of the post-treatment X-direction guide 66 to move the post-treatment carriage 64 in the X-direction. It should be noted that the position accuracy of the movement of the post-treatment carriage 64 in the X-direction is lower than the position accuracy of the movement of the printing carriage 44 in the X-direction.

The post-treatment control unit 90 controls the rotation and driving of the motor (not shown) of the post-treatment Y-direction guide 68 to move the post-treatment X-direction guide 66 in the Y-direction. The post-treatment control unit 90 controls the irradiation of the infrared rays by the infrared heater 62.

The integrated control unit 92 controls the image forming device 100 in an integrated manner. The integrated control unit 92 comprises a communication interface (not shown), and acquires the image data and the printing position information to be printed by the printing unit 40. The integrated control unit 92 may acquire the image data and the printing position information input from the user interface 80. The integrated control unit 92 may comprise storage (not shown) and store the acquired image data and printing position information. It should be noted that the printing position information may be included in the image data.

The integrated control unit 92 performs halftone processing or the like on the acquired image data to generate dot data. The halftone processing is processing of generating binarized dot data which defines the presence or absence of dots for each pixel from a gradation value of the image data. The integrated control unit 92 calculates an amount of the ink jetted from the ink jetting head 42, that is, the applied amount of the ink in the printing unit 40, based on the dot data.

The integrated control unit 92 controls the pretreatment control unit 86 to control a jetting timing of the pretreatment liquid by the pretreatment liquid jetting head 22. In addition, the integrated control unit 92 controls the printing control unit 88 to control a jetting timing of the ink by the ink jetting head 42. Further, the integrated control unit 92 controls the post-treatment control unit 90 to control an irradiation timing of the infrared rays by the infrared heater 62.

The integrated control unit 92 controls the jetting timing of the pretreatment liquid by the pretreatment liquid jetting head 22, the jetting timing of the ink by the ink jetting head 42, and the irradiation timing of the infrared rays by the infrared heater 62.

In addition, the integrated control unit 92 comprises an information acquisition unit 94, a position control unit 96, and a distance control unit 98.

The information acquisition unit 94 acquires information on a surface state of the printing surface of the recording medium P. The information acquisition unit 94 acquires, for example, the information on the surface state of the printing surface of the recording medium P from the information on the image printed in advance on the recording medium P input from the user interface 80. The information on the image printed in advance on the recording medium P may be input by the communication interface. The information acquisition unit 94 may acquire the information on the surface state of the printing surface of the recording medium P from the image of the printing surface of the recording medium P captured by the inline sensor (not shown).

In addition, the information acquisition unit 94 acquires information on the transportation speed of the recording medium P from the transport control unit 84. The information acquisition unit 94 may acquire the transportation speed of the recording medium P input from the user interface 80 by the user.

Further, the information acquisition unit 94 acquires information on the applied amount of the ink calculated in the integrated control unit 92.

It should be noted that the information acquisition unit 94 need only acquire at least one of the information on the surface state, the information on the transportation speed, or the information on the applied amount of the ink.

The integrated control unit 92 calculates an optimum distance $L_1$ in the Y-direction between the pretreatment liquid jetting head 22 and the ink jetting head 42 based on the information acquired by the information acquisition unit 94. Similarly, the integrated control unit 92 calculates an optimum distance $L_2$ in the Y-direction between the ink jetting head 42 and the infrared heater 62 based on the information acquired by the information acquisition unit 94.

The position control unit 96 controls the printing control unit 88 based on the information on the position in the X-direction in the acquired printing position information of the image data to move the position of the printing carriage 44 in the X-direction. As a result, the position control unit 96 changes the position of the ink jetting head 42 in the X-direction to the position at which the image is printed.

In addition, the position control unit 96 controls the pretreatment control unit 86 based on the information on the position of the printing carriage 44 in the X-direction to move the pretreatment carriage 24 in the X-direction. As a result, the position control unit 96 changes the position of the pretreatment liquid jetting head 22 in the X-direction to the position at which the image is printed, that is, the same position as the position of the ink jetting head 42 in the X-direction. Similarly, the position control unit 96 controls the post-treatment control unit 90 based on the information on the position of the printing carriage 44 in the X-direction to move the post-treatment carriage 64 in the X-direction. As a result, the position control unit 96 changes the position of the infrared heater 62 in the X-direction to the position at which the image is printed, that is, the same position as the position of the ink jetting head 42 in the X-direction.

The distance control unit 98 controls the pretreatment control unit 86 to change the position of the pretreatment X-direction guide 26 in the Y-direction such that the distance between the pretreatment unit 20 and the printing unit 40 in the Y-direction is the distance $L_1$ calculated in the integrated control unit 92. In addition, the distance control unit 98 controls the post-treatment control unit 90 to change the position of the post-treatment X-direction guide 66 in the Y-direction such that the distance between the printing unit 40 and the post-treatment unit 60 in the Y-direction is the distance $L_2$ calculated in the integrated control unit 92.

<Manufacturing Method of Printed Material>

Figure 4:
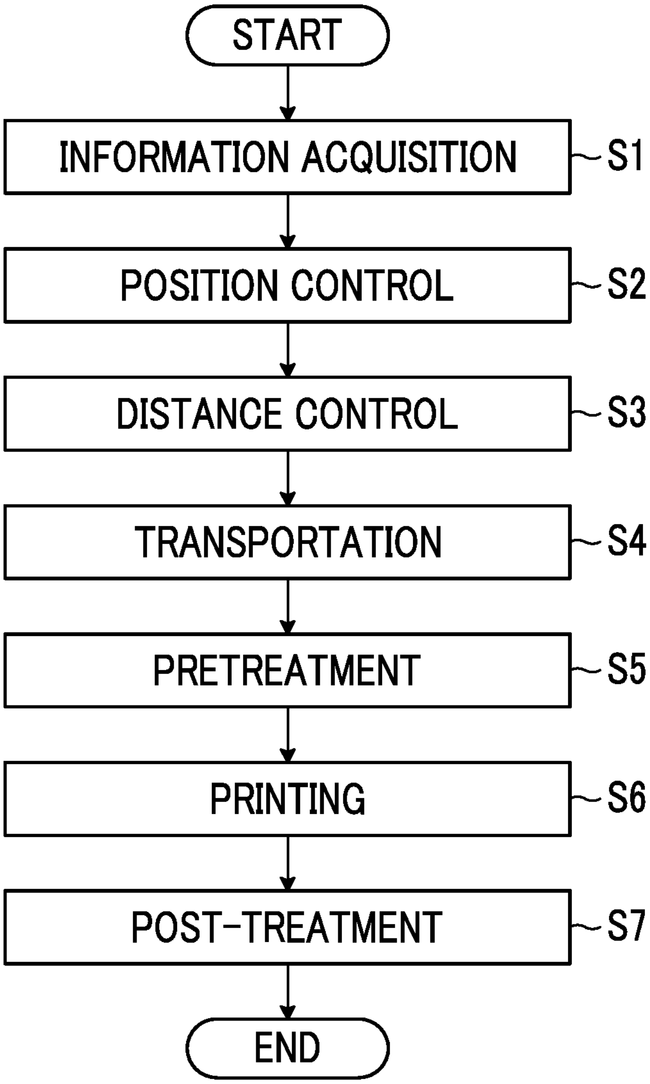
FIG. 4 is a flowchart showing a process of a manufacturing method of a printed material.

FIG. 4 is a flowchart showing a process of a manufacturing method of the printed material. Here, an example will be described in which the printed material is manufactured by performing additional printing on a part of the printing surface of the recording medium P on which the image is printed in advance on the printing surface before the pretreatment by the pretreatment unit 20.

As shown in FIG. 4, the manufacturing method of the printed material includes an information acquisition step (step S1), a position control step (step S2), a distance control step (step S3), a transport step (step S4), a pretreatment step (step S5), a printing step (step S6), and a post-treatment step (step S7).

In step S1, the integrated control unit 92 acquires the image data and the printing position information to be printed by the printing unit 40 from the communication interface (not shown). The integrated control unit 92 may acquire the image data and the printing position information from the user interface 80. The integrated control unit 92 generates the dot data from the acquired image data, and calculates the applied amount of the ink in the printing unit 40 based on the dot data. The information acquisition unit 94 acquires the applied amount of the ink calculated by the integrated control unit 92.

In addition, the user operates the user interface 80 to input the information on the image printed in advance on the recording medium P. The information acquisition unit 94 acquires the surface state of the printing surface of the recording medium P from the information on the image. The information acquisition unit 94 may acquire the information on the image printed in advance on the recording medium P from the communication interface, or may acquire the information on the image printed in advance on the recording medium P from the image of the printing surface of the recording medium P captured by the inline sensor (not shown).

In addition, the information acquisition unit 94 acquires the information on the transportation speed of the recording medium P from the transport control unit 84. The information acquisition unit 94 may acquire the information on the transportation speed of the recording medium P input by the user by operating the user interface 80. The information acquisition unit 94 may transport the recording medium P by the transport unit 18 via the transport control unit 84 to acquire the transportation speed of the recording medium P detected by the transportation speed detection unit.

In step S2, the position control unit 96 moves the position of the ink jetting head 42 in the X-direction to the position at which the image is printed, based on the information on the position in the X-direction in the printing position information acquired in step S1. In addition, the position control unit 96 moves the positions of the pretreatment liquid jetting head 22 and the infrared heater 62 in the X-direction to the same position as the position of the ink jetting head 42 in the X-direction based on the information on the position of the printing carriage 44 in the X-direction.

It should be noted that, as described above, the position accuracy of the movement of the printing carriage 44 in the X-direction is higher than the position accuracy of the movement of the pretreatment carriage 24 in the X-direction and the position accuracy of the movement of the post-treatment carriage 64 in the X-direction. Therefore, in some cases, it is not possible to move the positions of the pretreatment liquid jetting head 22 and the infrared heater 62 in the X-direction to exactly the same position as the position of the ink jetting head 42 in the X-direction. In this case, the movement need only be performed to the position closest to the position of the ink jetting head 42 in the X-direction in terms of the position accuracy of the movement of the pretreatment carriage 24 in the X-direction and the position accuracy of the movement of the post-treatment carriage 64 in the X-direction.

In step S3, the integrated control unit 92 calculates the optimum distance $L_1$ in the Y-direction between the pretreatment liquid jetting head 22 and the ink jetting head 42 based on the information acquired by the information acquisition unit 94. The distance control unit 98 changes the position of the pretreatment X-direction guide 26 in the Y-direction to set the distance between the pretreatment unit 20 and the printing unit 40 in the Y-direction to the distance $L_1$.

Similarly, the integrated control unit 92 calculates the optimum distance $L_2$ in the Y-direction between the ink jetting head 42 and the infrared heater 62 based on the information acquired by the information acquisition unit 94. The distance control unit 98 changes the position of the post-treatment X-direction guide 66 in the Y-direction to set the distance between the printing unit 40 and the post-treatment unit 60 in the Y-direction to the distance $L_2$.

It should be noted that the details of the distance $L_1$ and the distance $L_2$ will be described below.

Subsequently, in step S4, the transport control unit 84 transports the recording medium P by the transport unit 18 at a predetermined transportation speed. This transportation speed is the transportation speed of the recording medium P acquired by the information acquisition unit 94 in step S1.

In step S5, the integrated control unit 92 controls the pretreatment control unit 86 to control the jetting timing of the pretreatment liquid by the pretreatment liquid jetting head 22. Here, the integrated control unit 92 controls the pretreatment control unit 86 based on the information on the position in the Y-direction in the acquired printing position information of the image data, the information on the image printed in advance on the recording medium P captured by the inline sensor (not shown), and the information on the transportation speed of the recording medium P by the transport unit 18.

For example, the integrated control unit 92 detects, by the inline sensor, an image region of the position in the Y-direction at which the image is printed in the printing unit 40 in the image printed in advance on the recording medium P transported by the transport unit 18, and jets the pretreatment liquid by the pretreatment liquid jetting head 22 after a time, which is a value obtained by dividing the distance between the inline sensor and the pretreatment liquid jetting head 22 in the Y-direction by the transportation speed of the recording medium P, has elapsed from the detection by the inline sensor. As a result, the pretreatment liquid jetting head 22 jets the pretreatment liquid to the recording medium P, and the jetted pretreatment liquid is applied to the position based on the printing position information of the recording medium P. The jetting timing of the pretreatment liquid by the pretreatment liquid jetting head 22 may be acquired by another method as appropriate.

In step S6, the integrated control unit 92 controls the printing control unit 88 to control the jetting timing of the ink by the ink jetting head 42. Here, the jetting timing of the ink by the ink jetting head 42 is acquired in the same manner as the jetting timing of the pretreatment liquid by the pretreatment liquid jetting head 22. As a result, the ink jetting head 42 jets the ink to the recording medium P, and the jetted ink is applied to the position based on the printing position information of the recording medium P to print the image.

In step S7, the integrated control unit 92 controls the post-treatment control unit 90 to control the irradiation timing of the infrared rays by the infrared heater 62. Here, the irradiation timing of the infrared rays by the infrared heater 62 is acquired in the same manner as the jetting timing of the pretreatment liquid by the pretreatment liquid jetting head 22. As a result, the infrared heater 62 emits the infrared rays from the infrared light source, and the emitted infrared rays are emitted to the position based on the printing position information of the recording medium P to dry the pretreatment liquid and the ink.

In a case in which all the processes for the recording medium P is terminated, the integrated control unit 92 controls the transport control unit 84 to stop the transportation of the recording medium P by the transport unit 18.

In addition, the integrated control unit 92 rotates and drives the motor (not shown) of the printing X-direction guide 46 by the printing control unit 88 to move the printing carriage 44 to the cleaning unit 48. The printing control unit 88 wipes the nozzle surface of the ink jetting head 42 by the cleaning unit 48. Further, the integrated control unit 92 rotates and drives the motor (not shown) of the printing X-direction guide 46 by the printing control unit 88 to move the printing carriage 44 to the position of the capping unit 50. The printing control unit 88 moisturizes the nozzle surface of the ink jetting head 42 by the capping unit 50.

In this way, the process of manufacturing method of the printed material is terminated. With the manufacturing method of the printed material according to the present embodiment, since at least one of the information on the surface state, the information on the transportation speed, or the information on the applied amount of the ink is acquired in the information acquisition unit 94, and the distance between the pretreatment unit 20 and the printing unit 40 in the Y-direction and the distance between the printing unit 40 and the post-treatment unit 60 in the Y-direction are controlled based on the acquired information, it is possible to always form the image with the optimum treatment quality while keeping the transportation speed of the recording medium P by the transport unit 18 at a certain speed.

Here, a case has been described in which additional printing is performed on the recording medium P, but the printed material may be manufactured by performing printing on the recording medium P in which the image is not printed on the printing surface. In this case, the information acquisition unit 94 may acquire information on the material of the recording medium P, information on the presence or absence of coating, and the like as the information on the surface state of the printing surface of the recording medium P.

In the present embodiment, the pretreatment carriage 24 of the pretreatment unit 20, the printing carriage 44 of the printing unit 40, and the post-treatment carriage 64 of the post-treatment unit 60 can independently move in the X-direction. Therefore, a weight of the printing carriage 44 can be reduced as compared with a configuration in which the pretreatment carriage 24 of the pretreatment unit 20, the printing carriage 44 of the printing unit 40, and the post-treatment carriage 64 of the post-treatment unit 60 are integrally moved, and the position accuracy of the movement of the printing carriage 44 in the X-direction can be made high.

In addition, since only the printing carriage 44 is moved to a position separated from the transport unit 18 in the X-direction during non-printing, the pretreatment carriage 24 and the post-treatment carriage 64 are not moved unnecessarily. Further, since the infrared heater 62 mounted on the post-treatment carriage 64, the light source of the energy light for curing the ink, or the like may adversely affect the ink jetting head 42, it is effective to separate the positions of the printing carriage 44 and the post-treatment carriage 64 in the X-direction.

<Distance $L_1$ and Distance $L_2$>

In image forming, the treatment quality of the pretreatment and post-treatment of printing varies depending on the surface state (physical and chemical properties) of the recording medium P. Here, by changing the time from the pretreatment to printing in accordance with the surface state of the recording medium P, the pretreatment quality can be brought close to a certain level. The time from pretreatment to printing can be controlled by changing the distance $L_1$ between the pretreatment unit 20 and the printing unit 40 in the Y-direction.

Similarly, by changing the time from printing to post-treatment in accordance with the surface state of the recording medium P, the post-treatment quality can be brought close to a certain level. The time from printing to post-treatment can be controlled by changing the distance $L_2$ between the printing unit 40 and the post-treatment unit 60 in the Y-direction.

The surface state of the recording medium P in additional printing varies depending on the image printed in advance. Therefore, changing the distance $L_1$ between the pretreatment unit 20 and the printing unit 40 in the Y-direction and the distance $L_2$ between the printing unit 40 and the post-treatment unit 60 in the Y-direction is particularly effective in additional printing.

[Control in Case in which Density of Image Printed in Advance is Dense]

In a case in which the density of the image printed in advance is dense, that is, the amount of the ink is large, the permeation of the ink applied in the printing unit 40 into the recording medium P is suppressed. Therefore, the ink applied in the printing unit 40 tends to bleed on the printing surface. Therefore, it is preferable to decrease the distance $L_2$ between the printing unit 40 and the post-treatment unit 60, such as drying or ultraviolet curing.

That is, the information acquisition unit 94 acquires information on the density of the image printed in advance as the information on the surface state of the printing surface of the recording medium P, and the distance control unit 98 decreases the distance $L_2$ between the printing unit 40 and the post-treatment unit 60 in the Y-direction as the acquired density is denser. The information acquisition unit 94 need only acquire the information on the amount of the ink on the image printed in advance as the information on the density of the image, and the distance control unit 98 need only decrease the distance $L_2$ between the printing unit 40 and the post-treatment unit 60 in the Y-direction as the acquired amount of the ink is larger.

In addition, in a case in which the amount of the ink in the image printed in advance is large, the permeation of the pretreatment liquid applied by the pretreatment unit 20 into the recording medium P is suppressed. Therefore, the reactivity of the pretreatment liquid is improved. Therefore, it is preferable to increase the distance $L_1$ between the pretreatment unit 20 that applies the pretreatment liquid that chemically reacts with the ink applied in the printing unit 40 and the printing unit 40.

That is, the information acquisition unit 94 acquires the information on the amount of the ink in the image printed in advance, and the distance control unit 98 increases the distance $L_1$ between the pretreatment unit 20 and the printing unit 40 in the Y-direction as the acquired amount of the ink is larger.

The information acquisition unit 94 may acquire the information on the density of the region of the image printed in advance to which the ink is applied in the printing unit 40 as the information on the surface state of the printing surface of the recording medium P.

[Control in Case in which Image Printed in Advance is Electrophotographic Picture or is Printed Using Energy Ray Curable Ink, such as UV Ink or EB Ink, instead of Oil-Based Offset Printing]

In a case in which the image printed in advance is the electrophotographic picture and is printed using the energy ray curable ink, such as ultra violet (UV) ink that is cured by emitting ultraviolet rays or electron beam (EB) ink that is cured by emitting electron beams, the ink in the image printed in advance acts as a permeation suppression layer. Therefore, the permeation of the ink applied in the printing unit 40 into the recording medium P is suppressed, and the ink applied in the printing unit 40 tends to bleed on the printing surface of the recording medium P. Therefore, it is preferable to decrease the distance $L_2$ between the printing unit 40 and the post-treatment unit 60, such as drying or ultraviolet curing.

That is, the information acquisition unit 94 acquires, as the information on the surface state of the printing surface of the recording medium P, whether the image printed in advance is the electrophotographic picture or the image printed using the energy ray curable ink, and the distance control unit 98 decreases the distance $L_2$ between the printing unit 40 and the post-treatment unit 60 in the Y-direction in a case in which the acquired surface state is printing of the electrophotographic picture or printing using the energy ray curable ink.

In addition, in a case in which the image printed in advance is the electrophotographic picture, or in a case in which the image printed in advance is printed using the energy ray curable ink, the ink of the image printed in advance acts as the permeation suppression layer. Therefore, the permeation of the pretreatment liquid applied in the pretreatment unit 20 into the recording medium P is suppressed, and the reactivity of the pretreatment liquid is improved. Therefore, it is preferable to increase the distance $L_1$ between the pretreatment unit 20 that applies the pretreatment liquid that chemically reacts with the ink applied in the printing unit 40 and the printing unit 40.

That is, the information acquisition unit 94 acquires the information on the surface state of the printing surface of the recording medium P, and the distance control unit 98 increases the distance $L_1$ between the pretreatment unit 20 and the printing unit 40 in the Y-direction in a case in which the acquired surface state is printing of the electrophotographic picture or printing using the energy ray curable ink.

[Control in accordance with Transportation Speed]

Generally, the pretreatment quality is changed in accordance with the time from pretreatment by the pretreatment unit 20 to printing by the printing unit 40. Similarly, the post-treatment quality is changed in accordance with the time from printing by the printing unit 40 to post-treatment by the post-treatment unit 60. This characteristic is not limited to additional printing. Therefore, it is preferable to change the distance between the printing unit 40, and the pretreatment unit 20 and the post-treatment unit 60 in accordance with the transportation speed of the recording medium P in the transport unit 18.

That is, the information acquisition unit 94 acquires the information on the transportation speed of the recording medium P in the transport unit 18, and the distance control unit 98 increases the distance $L_1$ between the pretreatment unit 20 and the printing unit 40 in the Y-direction, and the distance $L_2$ between the printing unit 40 and the post-treatment unit 60 in the Y-direction as the acquired transportation speed is faster. As a result, it is possible to keep the quality of the pretreatment and the post-treatment to a certain level regardless of the transportation speed of the recording medium P.

[Control in accordance with Information on Applied Amount of Ink]

Generally, the pretreatment unit 20 and the post-treatment unit 60 adversely affect the jettability of the ink jetting head 42 of the printing unit 40. This characteristic is not limited to additional printing. Therefore, it is preferable to decrease the distance between the printing unit 40, and the pretreatment unit 20 and the post-treatment unit 60 as the applied amount of the ink to the printing unit 40 is larger.

That is, the information acquisition unit 94 acquires the information on the applied amount of the ink in the printing unit 40, and the distance control unit 98 decreases the distance $L_1$ between the pretreatment unit 20 and the printing unit 40 in the Y-direction, and the distance $L_2$ between the printing unit 40 and the post-treatment unit 60 in the Y-direction as the acquired applied amount of the ink is larger.

Specifically, the image to be printed in the printing unit 40 is divided into a plurality of regions, the amount of the ink for each region is calculated, and the maximum amount thereof is defined as the applied amount of the ink of the image. It is preferable to control the distance $L_1$ between the pretreatment unit 20 and the printing unit 40 and the distance $L_2$ between the printing unit 40 and the post-treatment unit 60 in accordance with the defined applied amount of the ink.

<Another Embodiment of Image Forming Device>

Figure 5:
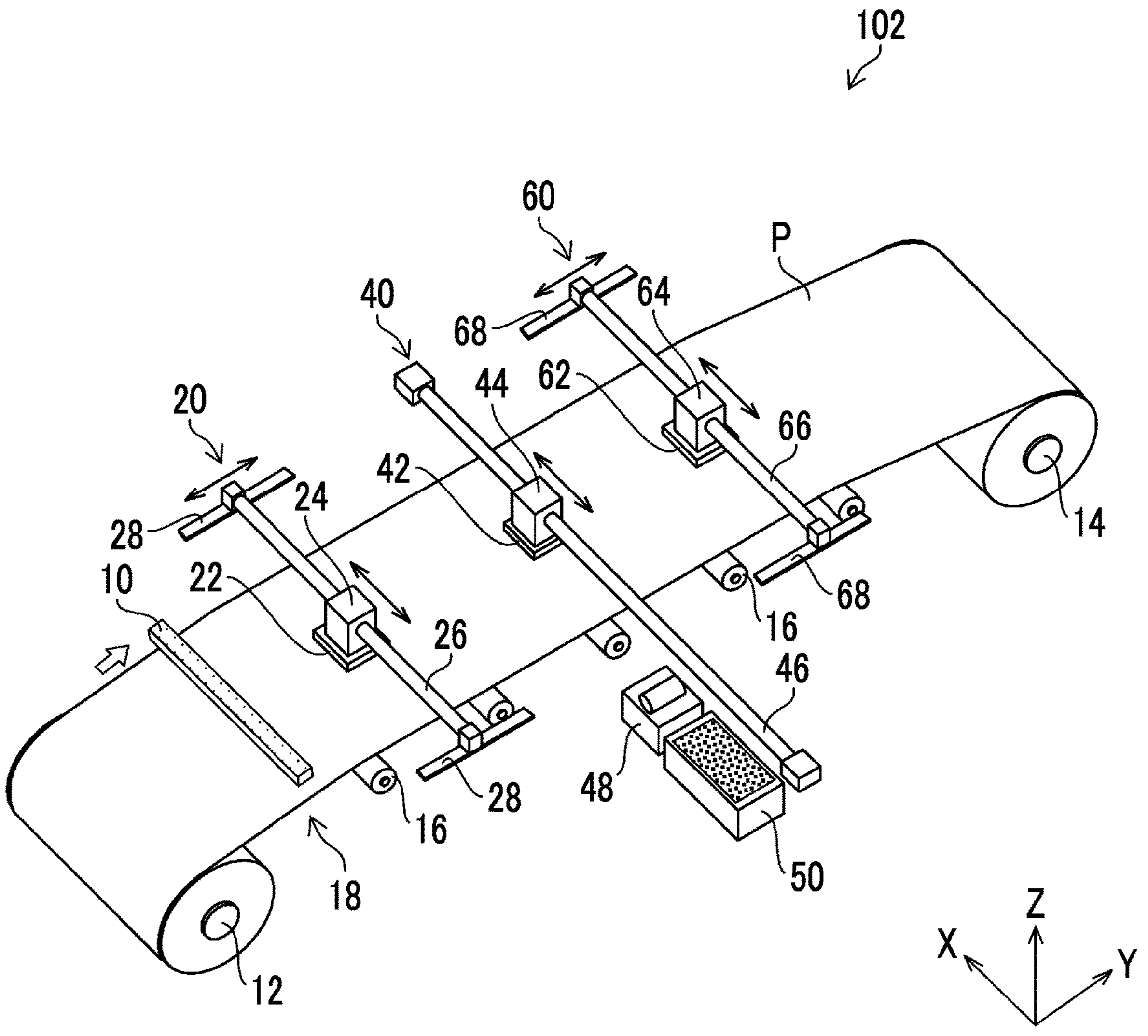
FIG. 5 is a perspective view of an image forming device according to another embodiment.

FIG. 5 is a perspective view of an image forming device 102 according to another embodiment. It should be noted that the same reference numerals are given to the parts common to the image forming device 100, and the detailed description thereof will be omitted.

The recording medium P before the image is printed is wound on the sending reel 12 of the image forming device 102 in a roll shape.

The image forming device 102 comprises an ink jetting head for main printing 10 as a main printing unit. The ink jetting head for main printing 10 is a unit that jets the ink from the nozzle (not shown) disposed on the nozzle surface (not shown) by the inkjet method to perform main printing on the recording medium P. The ink jetting head for main printing 10 is a so-called line head in which a plurality of nozzles (not shown) that jet the ink are arranged over a length equal to or larger than a width of the recording medium P in the X-direction. The line head may be configured by connecting a plurality of head modules (not shown) to each other. The ink jetting head for main printing 10 is disposed with the nozzle surface (not shown) facing the transport unit 18.

The ink jetting head for main printing 10 prints the image on the surface of the recording medium P by jetting the ink from the nozzle formed on the nozzle surface to the recording medium P. As described above, the ink jetting head for main printing 10 records the image by a so-called single-pass method by scanning the recording medium P once.

The image printed by the ink jetting head for main printing 10 corresponds to the "image printed in advance on the recording medium P" in the image forming device 100.

The cleaning unit that wipes the nozzle surface of the ink jetting head for main printing 10 and the capping unit that moisturizes the nozzle surface of the ink jetting head for main printing 10 may be provided.

On the upstream side of the recording medium P in the transport direction of the ink jetting head for main printing 10, at least one pretreatment of applying of the pretreatment liquid that chemically reacts with the ink jetted in the ink jetting head for main printing 10, irradiation of the energy light that promotes the permeation of the ink jetted in the ink jetting head for main printing 10 to the printing surface, or surface reforming that suppresses the spread of the ink jetted in the ink jetting head for main printing 10 on the printing surface may be performed on the recording medium P.

In addition, on the downstream side of the recording medium P in the transport direction from the ink jetting head for main printing 10, at least one post-treatment of irradiation of the energy light that cures the ink jetted in the ink jetting head for main printing 10 or drying of the ink jetted in the ink jetting head for main printing 10 may be performed on the recording medium P.

The unit that performs the main printing on the recording medium P is not limited to the inkjet method, and may be an offset printing method, an electrophotographic picture printing method, or an energy ray curable ink printing method.

<Others>

In the image forming devices 100 and 102 according to the present embodiment, the position of the pretreatment X-direction guide 26 in the Y-direction is changed to change the distance between the pretreatment unit 20 and the printing unit 40 in the Y-direction. However, a configuration may be adopted in which the printing X-direction guide 46 is made to be movable in the Y-direction, and the printing X-direction guide 46 is moved in the Y-direction to change the distance between the pretreatment unit 20 and the printing unit 40 in the Y-direction. Similarly, the printing X-direction guide 46 may be moved in the Y-direction to change the distance between the printing unit 40 and the post-treatment unit 60 in the Y-direction.

In addition, by keeping the position of the pretreatment X-direction guide 26 and the position of the printing X-direction guide 46 at a certain position and changing the transport path by the transport unit 18, the distance between the pretreatment unit 20 and the printing unit 40 in the transport direction may be controlled to change the time from pretreatment to printing. For example, between the pretreatment unit 20 and the printing unit 40, by making the traveling direction of the recording medium P to the transport path, which is once directed downward in the Z-direction and then is folded back and returned upward in the Z-direction, and changing the distance to the fold, the transport path can be changed. Similarly, by keeping the position of the printing X-direction guide 46 and the position of the post-treatment X-direction guide 66 at a certain position and changing the transport path by the transport unit 18, the distance between the printing unit 40 and the post-treatment unit 60 in the transport direction may be controlled to change the time from printing to post-treatment.

In the embodiments described so far, for example, the hardware structure of the processing unit that executes various processing, such as the transport control unit 84, the pretreatment control unit 86, the printing control unit 88, the post-treatment control unit 90, and the integrated control unit 92, is the following various processors. The various processors include a central processing unit (CPU) that is a general-purpose processor which executes software (program) to function as various processing units, a graphics processing unit (GPU) that is a processor specialized in image processing, a programmable logic device (PLD) that is a processor of which a circuit configuration after the manufacture, such as a field programmable gate array (FPGA), a dedicated electric circuit that is a processor having a dedicated circuit configuration designed to execute specific processing, such as an application specific integrated circuit (ASIC), and the like.

One processing unit may be composed of one of these various processors, or may be composed of two or more processors of the same type or different types (for example, a plurality of FPGAs, a combination of a CPU and an FPGA, or a combination of a CPU and a GPU). In addition, a plurality of processing units may be composed of one processor. As an example of configuring the plurality of processing units with one processor, first, as represented by a computer, such as a server or a client, there is a form in which one processor is composed of a combination of one or more CPUs and software, and the processor functions as the plurality of processing units. Second, as represented by a system on chip (SoC) or the like, there is a form in which the processor is used in which the functions of the entire system which includes the plurality of processing units are realized by a single integrated circuit (IC) chip. As described above, the various processing units are composed of one or more of the various processors as the hardware structure.

Further, the hardware structure of these various processors is, more specifically, an electric circuit (circuitry) in which circuit elements, such as semiconductor elements, are combined.

The technical scope of the present invention is not limited to the scope of the embodiments described above. The configurations and the like in the embodiments can be appropriately combined without departing from the spirit of the present invention.

EXPLANATION OF REFERENCES

12: sending reel
14: winding reel
16: pass roller
18: transport unit
20: pretreatment unit
22: pretreatment liquid jetting head
24: pretreatment carriage
26: pretreatment X-direction guide
28: pretreatment Y-direction guide
40: printing unit
42: ink jetting head
44: printing carriage
46: printing X-direction guide
48: cleaning unit
50: capping unit
60: post-treatment unit
62: infrared heater
64: post-treatment carriage
66: post-treatment X-direction guide
68: post-treatment Y-direction guide
80: user interface
84: transport control unit
86: pretreatment control unit
88: printing control unit
90: post-treatment control unit
92: integrated control unit
94: information acquisition unit
96: position control unit
98: distance control unit
100: image forming device
S1 to S7: steps of process of manufacturing method of printed material

What is claimed is:

1. An image forming device comprising:

a transport unit that transports a recording medium in a transport direction;

a printing unit that is disposed to face the transport unit and applies an ink to a printing surface of the transported recording medium to perform printing;

a treatment unit that is disposed to face the transport unit and performs treatment on the transported recording medium;

a movement unit that changes a distance between the printing unit and the treatment unit in the transport direction;

an information acquisition unit that acquires at least one information of information on a transportation speed of the recording medium in the transport unit, information on an applied amount of the ink in the printing unit, or information on a surface state of the printing surface of the recording medium; and a distance control unit that controls the distance based on the acquired information, wherein an image is printed on the printing surface of the recording medium in advance before the printing by the printing unit and the treatment by the treatment unit, the information acquisition unit acquires whether the image printed in advance is an electrophotographic picture or an image printed by using an energy ray curable ink, as the information on the surface state of the printing surface of the recording medium, and the distance control unit decreases the distance between the printing unit and the treatment unit in the transport direction in a case in which the image printed in advance is the electrophotographic picture or the image printed by using the energy ray curable ink.

2. The image forming device according to claim 1, wherein an image is printed on the printing surface of the recording medium in advance before printing by the printing unit and treatment by the treatment unit, the information acquisition unit acquires information on density of the image printed in advance, as the information on the surface state of the printing surface of the recording medium, and the distance control unit increases the distance between the treatment unit and the printing unit in the transport direction as the acquired density is denser.

3. The image forming device according to claim 1, wherein the information acquisition unit acquires the information on the transportation speed of the recording medium in the transport unit, and the distance control unit increases the distance as the acquired transportation speed is faster.

4. The image forming device according to claim 1, wherein the information acquisition unit acquires the information on the applied amount of the ink in the printing unit, and the distance control unit decreases the distance as the acquired applied amount of the ink is larger.

5. The image forming device according to claim 1, wherein the printing unit and the treatment unit are movable in a width direction intersecting the transport direction, the printing unit is able to perform printing on a part of the recording medium, and the treatment unit is able to perform treatment on a part of the recording medium.

6. The image forming device according to claim 5, wherein the printing unit and the treatment unit are independently movable in the width direction.

7. The image forming device according to claim 6, further comprising:

a position control unit that controls movement of the treatment unit in the width direction based on positional information of the printing unit in the width direction.

8. The image forming device according to claim 6, wherein position accuracy of movement of the treatment unit in the width direction is lower than position accuracy of movement of the printing unit in the width direction.

9. The image forming device according to claim 5, wherein the printing unit includes an ink jetting head that jets the ink from a nozzle, a cleaning unit that is disposed adjacent to the transport unit in the width direction and wipes a nozzle surface of the ink jetting head on which the nozzle is disposed, and a capping unit that is disposed adjacent to the transport unit in the width direction and moisturizes the nozzle surface of the ink jetting head, and the movement unit changes the distance by moving the treatment unit in the transport direction.

10. The image forming device according to claim 1, wherein the treatment unit includes a pretreatment unit that is disposed on an upstream side of the printing unit in the transport direction and performs, on the transported recording medium, at least one pretreatment of applying a pretreatment liquid that chemically reacts with the applied ink, irradiation of energy light that promotes permeation of the applied ink into the printing surface, or surface reforming that suppresses spread of the applied ink on the printing surface.

11. The image forming device according to claim 1, wherein the treatment unit includes a post-treatment unit that is disposed on a downstream side of the printing unit in the transport direction and performs, on the transported recording medium, at least one post-treatment of irradiation of energy light that cures the applied ink or drying of the applied ink.

12. The image forming device according to claim 1, further comprising:

a main printing unit that is disposed to face the transport unit on an upstream side of the printing unit and the treatment unit in the transport direction, and performs main printing on the printing surface of the transported recording medium.

13. A manufacturing method of a printed material, the method comprising:

a transport step of transporting a recording medium in a transport direction by a transport unit;

a printing step of applying an ink to a printing surface of the transported recording medium to perform printing by a printing unit that is disposed to face the transport unit;

a treatment step of performing treatment on the transported recording medium by a treatment unit that is disposed to face the transport unit;

an information acquisition step of acquiring at least one information of information on a transportation speed of the recording medium in the transport unit, information on an applied amount of the ink in the printing unit, or information on a surface state of the printing surface of the recording medium; and a distance control step of controlling a distance between the printing unit and the treatment unit in the transport direction based on the acquired information by a movement unit that changes the distance, wherein an image is printed on the printing surface of the recording medium in advance before the printing by the printing unit and the treatment by the treatment unit, the information acquisition step includes acquiring whether the image printed in advance is an electrophotographic picture or an image printed by using an energy ray curable ink, as the information on the surface state of the printing surface of the recording medium, and the distance control step includes decreasing the distance between the printing unit and the treatment unit in the transport direction in a case in which the image printed in advance is the electrophotographic picture or the image printed by using the energy ray curable ink.

* * * * *